(12) United States Patent
Arbetter

(10) Patent No.: US 9,882,473 B2
(45) Date of Patent: Jan. 30, 2018

(54) POWER CONVERTER WITH ROBUST STABLE FEEDBACK

(71) Applicant: Silanna Asia Pte Ltd, Singapore (SG)

(72) Inventor: Barry S. Arbetter, Raleigh, NC (US)

(73) Assignee: Silanna Asia Pte Ltd, Singapore (SG)

( * ) Notice: Subject to any disclaimer, the term of this patent is extended or adjusted under 35 U.S.C. 154(b) by 0 days.

(21) Appl. No.: 15/245,078

(22) Filed: Aug. 23, 2016

(65) Prior Publication Data
US 2017/0331370 A1   Nov. 16, 2017

Related U.S. Application Data

(60) Provisional application No. 62/336,439, filed on May 13, 2016.

(51) Int. Cl.
*H02M 1/08* (2006.01)
*H02M 3/156* (2006.01)
*H02M 1/00* (2006.01)
*G05F 1/575* (2006.01)

(52) U.S. Cl.
CPC ............. *H02M 3/156* (2013.01); *H02M 1/08* (2013.01); *G05F 1/575* (2013.01); *H02M 2001/0009* (2013.01)

(58) Field of Classification Search
CPC .......... G05F 1/575; G05F 1/56; H02M 3/156; H02M 3/158; H02M 3/1588; H02M 3/155; H02M 3/1582; H02M 3/157; H02M 2003/1566; H02M 2003/1557; H02M 2001/0012
See application file for complete search history.

(56) References Cited

U.S. PATENT DOCUMENTS

| | | | |
|---|---|---|---|
| 6,614,136 B2 | 9/2003 | Lee | |
| 8,217,637 B2 | 7/2012 | Tsui et al. | |
| 9,256,236 B2 | 2/2016 | Kim et al. | |
| 2002/0097591 A1 | 7/2002 | Groot | |
| 2007/0103945 A1 | 5/2007 | Doerrer | |

(Continued)

FOREIGN PATENT DOCUMENTS

JP    2005198404 A    7/2005

OTHER PUBLICATIONS

Arikatla et al., DC-DC Power Converter with Digital PID Controller, Applied Power Electronics Conference and Exposition (APEC), 2011 Twenty-Sixth Annual IEEE, Mar. 2011, pp. 327-330.

(Continued)

*Primary Examiner* — Nguyen Tran
*Assistant Examiner* — Bryan R Perez
(74) *Attorney, Agent, or Firm* — The Mueller Law Office, P.C.

(57) ABSTRACT

Various methods and devices that involve power converter with stable feedback are disclosed. A disclosed power converter comprises an input node on an input side of the power converter and an output node on an output side of the power converter. The power converter also comprises a switch coupled to the input node and having a control node, a feedback path between the output node and the control node, and a first circuit block on the feedback path with a multi-path feedback active filter. The first circuit block is at least partly defined by a pure bandpass transfer function.

17 Claims, 14 Drawing Sheets

(56) References Cited

U.S. PATENT DOCUMENTS

| | | | | |
|---|---|---|---|---|
| 2009/0284235 A1* | 11/2009 | Weng | ................... | H02M 3/156 323/222 |
| 2012/0049827 A1 | 3/2012 | Hirose | | |
| 2014/0146577 A1 | 5/2014 | Uno | | |
| 2014/0253060 A1 | 9/2014 | Lin et al. | | |
| 2014/0292288 A1* | 10/2014 | Yan | ...................... | H02M 3/156 323/234 |
| 2016/0079858 A1 | 3/2016 | Chen | | |

OTHER PUBLICATIONS

Huerta et al., Design methodology of a non-invasive sensor to measure the current of the output capacitor for a very fast non-linear control, Applied Power Electronics Conference and Exposition, Feb. 2009. APEC 2009, pp. 806-812.

Kapat et al., Formulation of PID Control for DC-DC Converters Based on Capacitor Current: A Geometric Context, COMPEL, 2010 IEEE 12th Workshop, Jun. 28-30, 2010, pp. 1-6.

Oliver, Ripple-Based Control Techniques for Buck Type DC-DC Converter, ESSCIRC Sep. 2015, pp. 49-98.

Soto et al., Non-Linear Digital Control Breaks Bandwidth Limitations, Twenty-First Annual IEEE Applied Power Electronics Conference and Exposition, Mar. 2006, APEC '06, pp. 724-730.

Viejo et al., Fast Control Technique Based on Peak Current Mode Control of the Output Capacitor Current, 2010 IEEE Energy Conversion Congress and Exposition, Sep. 2010, pp. 3396-3402.

Wu et al., Area- and Power-Efficient Monolithic Buck Converters with Pseudo-Type III Compensation, IEEE Journal of Solid-State Circuits, vol. 45, No. 8, Aug. 2010, pp. 1446-1455.

Yuan et al., Psuedo-Type III Compensation Integrated in a Voltage-Mode Buck Regulator, IEEE Transactions on Circuits and Systems, Dec. 2014, pp. 997-1001.

International Search Report and Written Opinion dated Aug. 8, 2017 for PCT Patent Application No. PCT/IB2017/052512.

* cited by examiner

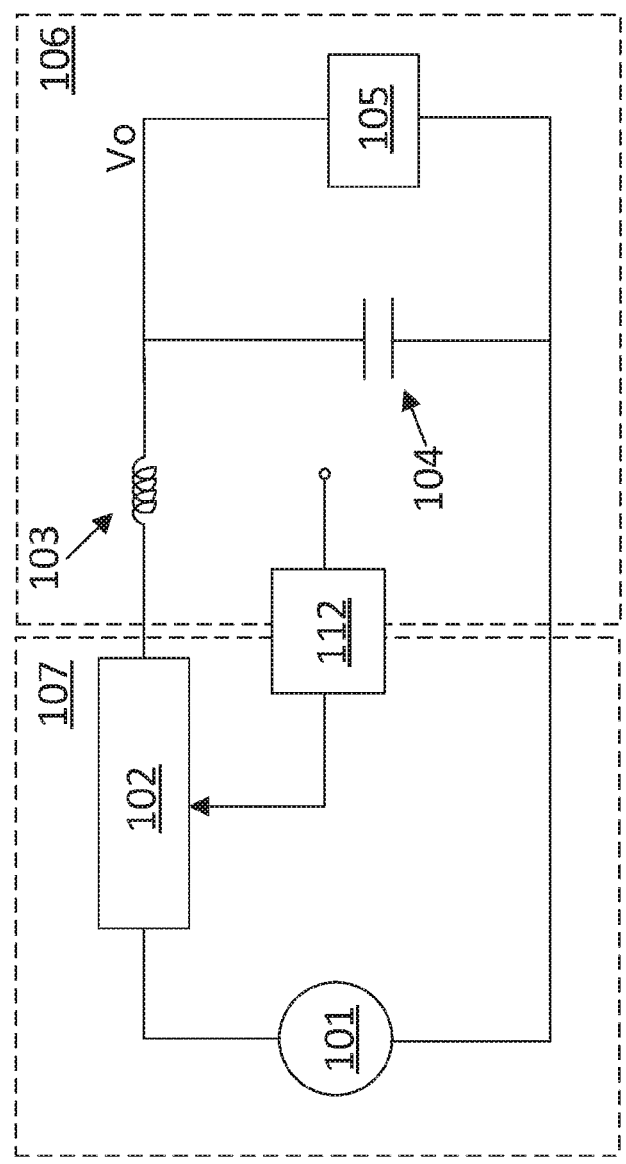
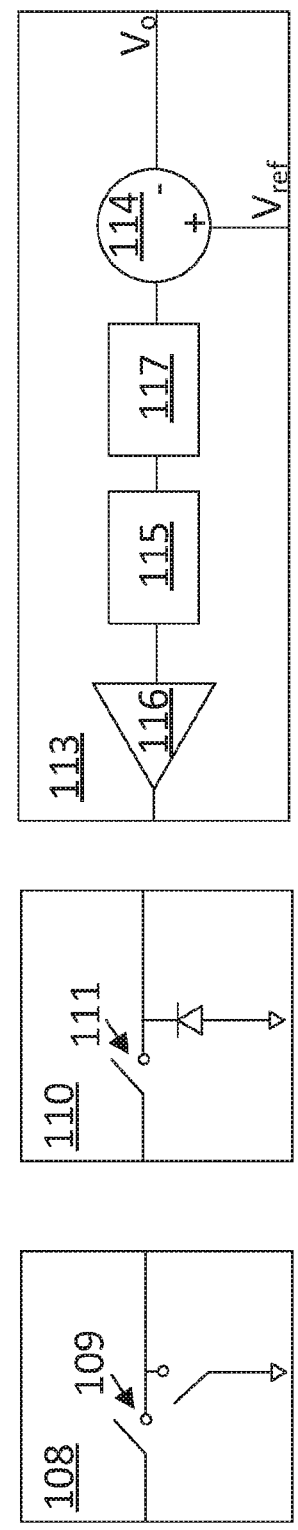
FIG. 1
100

300

400

FIG. 6
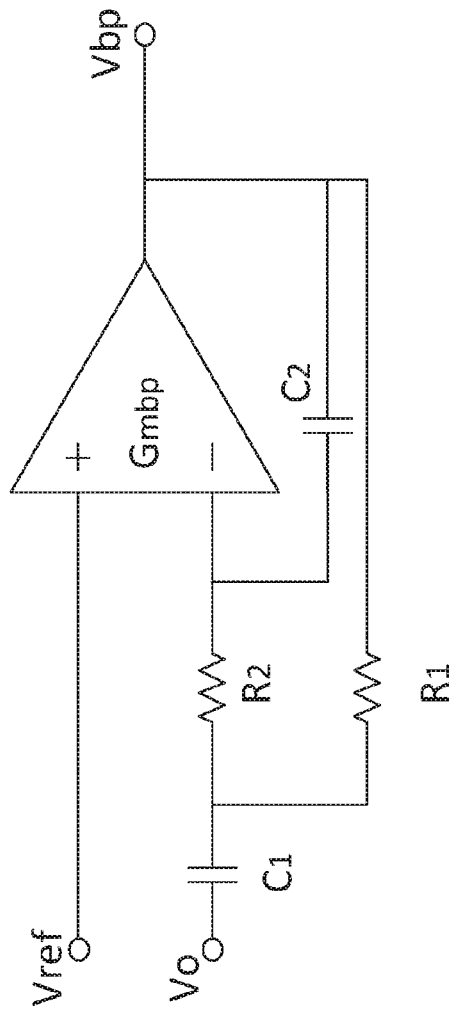
600
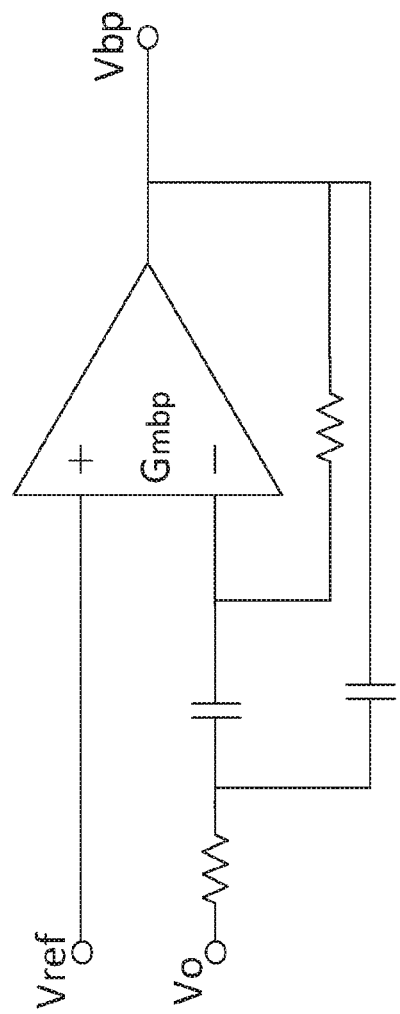
601

800

900

901
$$\frac{v_{BPF}}{v_0} = \frac{\left(\frac{1}{R_1 C_1}\right)s}{\left(s^2 + \frac{(C_1+C_2)}{C_1 C_2 R_2}s + \frac{1}{R_1 R_2 C_1 C_2}\right)}$$

902
$$\omega_0 = \frac{1}{\sqrt{R_1 R_2 C_1 C_2}}$$

$$Q = \frac{1}{(C_1+C_2)}\sqrt{\frac{C_1 C_2 R_2}{R_1}}$$

1000

1100

1200

1300

1400

POWER CONVERTER WITH ROBUST STABLE FEEDBACK

CROSS-REFERENCE TO RELATED APPLICATION

This application claims the benefit of U.S. Provisional Application No. 62/336,439, filed May 13, 2016, which is incorporated by reference herein in its entirety.

BACKGROUND OF THE INVENTION

Electronic devices often need to generate multiple power regimes while only being powered by a single source. For example, a laptop computer may only have a single battery but may need to produce power regimes with different supply voltages for the various components on the laptop. Furthermore, regardless of the need for multiple power regimes, electronic devices often need to condition the power that is delivered to them from an external source. Returning to the example of a laptop, the laptop processor contains sensitive electronics and exhibits a widely varying power demand based on how hard the processor is working. Simply plugging in a DC version of the mains voltage source is not an option because the processor will not be shielded from dips or surges in the power supply and the power supply will likewise not be able to keep pace with the rapid transitions in the power drawn by the processor. The aforementioned requirements are addressed by power converters.

Power converters receive power from a supply power regime and generate a regulated power regime. In one example, the power converter stabilizes a supply voltage in the regulated power regime and provides a varying current from the supply power regime in order to do so. Varying the current allows such a power converter to supply the varying power needs of any components or devices in the regulated power regime while keeping the supply voltage of the regulated power regime stable. Other power converters generate the regulated power regime by varying the voltage while keeping the current stable or vary both the current and voltage to keep an amount of power delivered to the regulated regime stable.

Power converters that vary their conditions with the varying status of the load in the regulated regime need information regarding that status. A common way to provide this information is through an electrical feedback path from the load back to the converter. The system can be controlled by negative feedback that forces a parameter back to a controlled target by pushing in the opposite direction of a detected variance from that controlled target. However, the utilization of electrical feedback paths presents the possibility of instability. Both the phase shift and amplification of an electrical path can vary with frequency. As a result, a system that exhibits a negative feedback characteristic to signals of a given frequency may exhibit a positive feedback characteristic to signals of another frequency. Power converters can utilize compensators in their feedback system to ensure the overall system is stable and well-behaved.

SUMMARY OF INVENTION

In one approach a power converter is disclosed. The power converter comprises an input node on an input side of the power converter and an output node on an output side of the power converter. The power converter also comprises a switch coupled to the input node and having a control node. The power converter also comprises a feedback path between the output node and the control node. The power converter also comprises a first circuit block on the feedback path with a multipath feedback active filter. The first circuit block is at least partly defined by a pure bandpass transfer function.

In one approach another power converter is disclosed. The power converter comprises an input node on an input side of the power converter and an output node on an output side of the power converter. The power converter also comprises a switch with a control node. The power converter also comprises a pulse width modulator that provides a control signal to the control node. The power converter also comprises a bandpass circuit that: (i) is AC coupled to the output side of the power converter node; (ii) includes a multipath feedback active filter; and (iii) produces a compensator signal. The power converter also comprises a sense circuit connected to the output side of the power converter that produces a first measurement signal. The control signal is based on the compensator signal and the first measurement signal.

In one approach a method for converting power using a power converter is disclosed. The power converter could be one of the power converters disclosed above. The method comprises transferring power from an input node to an output node using a switch connected to the input node. The switch defines an output side and an input side of the converter. The switch has a control node. The power converter also comprises obtaining a measurement signal from one of a voltage and a current on the output side of the converter. The power converter also comprises filtering the measurement signal using a bandpass filter circuit block to obtain a filtered measurement signal. The power converter also comprises delivering a control signal based on the filtered measurement signal to the control node using a controller. The bandpass filter is AC coupled to the output side. The bandpass filter has a quality factor greater than 0.5.

BRIEF DESCRIPTION OF THE DRAWINGS

FIG. 1 illustrates a block diagram of a power converter topology in accordance with embodiments of the present invention.

FIG. 6 illustrates two block diagrams of multipath feedback active filters that can serve as the bandpass filter in FIG. 4 in accordance with embodiments of the present invention.

DETAILED DESCRIPTION OF THE EMBODIMENTS

Figure 2:
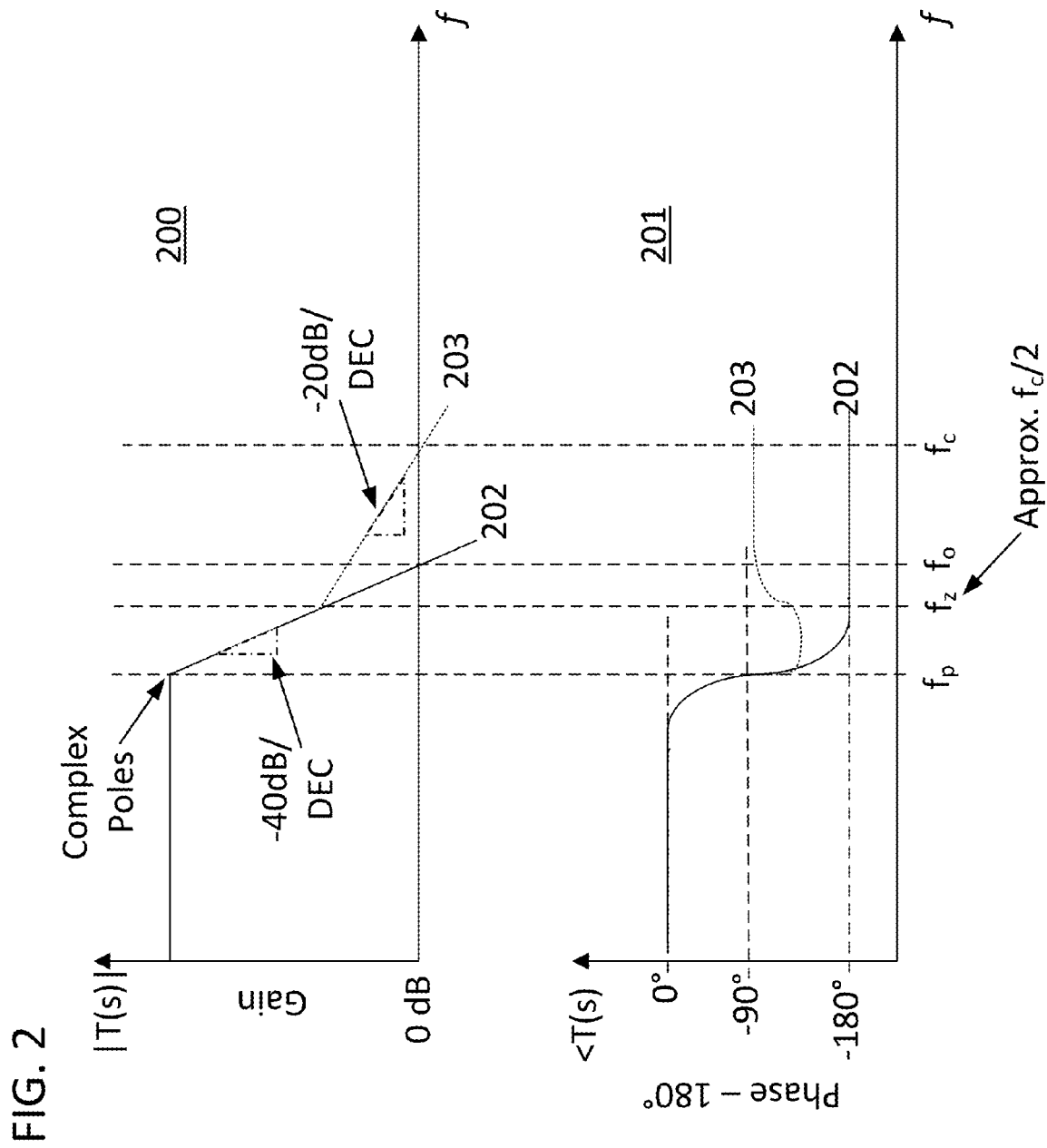
FIG. 2 illustrates a gain and phase plot of the closed loop transfer function of the control loop of a power converter to illustrate certain aspects of embodiments of the present invention.

Reference now will be made in detail to embodiments of the disclosed invention, one or more examples of which are illustrated in the accompanying drawings. Each example is provided by way of explanation of the present technology, not as a limitation of the present technology. In fact, it will be apparent to those skilled in the art that modifications and variations can be made in the present technology without departing from the scope thereof. For instance, features illustrated or described as part of one embodiment may be used with another embodiment to yield a still further embodiment. Thus, it is intended that the present subject matter covers all such modifications and variations within the scope of the appended claims and their equivalents.

Power converters with robust control systems and operating methods are disclosed. Switching converters will be utilized as a vehicle for illustrating the benefits of these systems and methods but the approaches disclosed herein are more broadly applicable to power converters in general. Some of the described approaches enable the use of minimal output capacitance but provide stability regardless of an increase in capacitance placed on the output node.

An example power converter 100 is provided in FIG. 1. Power converter 100 includes a supply 101, a switch circuit 102, an inductor 103, and a capacitor 104 for powering a load 105. The supply operates in the supply regime and the load operates in the regulated regime. The inductor and capacitor of this example form the output filter of this particular switching converter. Switch converter 100 is a buck converter that converts a higher voltage on the input node to a lower voltage on the output node. However, the teachings herein are applicable to buck, boost, buck-boost, boost-buck, or transformer-based converters. Two variants of switch circuit 102 are illustrated by circuit 108 (with switch 109) and circuit 110 (with switch 111). In either case, switch 109 and switch 111 are connected to an input node of the power converter and split the power converter between an output side 106 and an input side 107. The converter also includes a feedback path 112 that feeds back information regarding the output side 106 to switch circuit 102. The feedback path can be located between the output node, labeled $V_o$ in this example, and a control node for a switch in switching circuit 102. For example, the control node could be the gate of a field effect transistor serving as switch 109 or 111. The feedback path can include digital information, analog information, or a combination of both.

Feedback path 112 will often include a pulse-width modulator circuit to alter the duty cycle of switch circuit 102 based on the information fed back from output side 106. In this manner, power is delivered from supply 101 to load 105 in a regulated manner. In circuit 108 the illustrated switches may have opposite states and the duty cycle may affect the relative duration of occupancy for those two switches in either of those opposite states. One potential variant of feedback path 112 is illustrated by block diagram 113 which shows error amplifier 114 receiving a reference voltage $V_{ref}$ equal to the target voltage for the regulated regime. The output of the amplifier is provided to a pulse width modulator 115 and switch driver 116 which alter the duty cycle of the switch or switches in switch circuit 102 and thereby alter the amount of power transferred from the input side to the output side of the converter to maintain the output node at a target voltage proportional to $V_{ref}$. The further the output voltage is from the reference voltage the larger the swing in the duty cycle of the switch. As the duty cycle varies it forces the output voltage back to its desired value. A compensator 117, which is described with reference to FIG. 2, is provided between the error amplifier 114 and the pulse width modulator 115.

The stability of switching converter 100 can be described with reference to a loop gain T(s) that describes the control loop of the converter. The overall control loop of switching converter 100 includes feedback path 112, the control node of switch circuit 102, and the output node. In regular operation, the control loop can be at least partly defined by a loop gain. The phase and gain of the loop gain can be plotted separately across frequency to illustrate whether or not the loop gain is greater than unity when the characteristic of the loop switches from negative to positive. This determination can be utilized to estimate how stable the control loop is.

FIG. 2 provides gain plot 200 and phase plot 201 for the loop gain of the converter. The abscissa of both plots is frequency f provided in hertz in a logarithmic scale. The ordinate of gain plot 200 is a scalar value representative of the magnitude the loop gain. The ordinate of the phase plot 201 is a phase shift value in degrees where a 180° shift marks a change in characteristic of the loop gain between negative and positive. The plot includes two sets of curves as it illustrates the behavior of the control loop both with and without compensator 117 included. The loop gain without compensation is marked by reference numeral 202. The loop gain with compensation is marked by reference numeral 203.

Without compensation, the output filter introduces a set of complex poles at frequency $f_p$ set by the magnitude of inductor 103 and capacitor 104. The two poles cause a drop in the magnitude of the transfer function with a slope of −40 dB per decade and a phase shift from 0 to −180°. In the uncompensated case, the result is a −180° phase shift at the crossover frequency $f_o$. The system is therefore unstable because the feedback loop will exhibit appreciable positive feedback. Compensator 117 can be used to add a zero to the transfer function at frequency $f_z$. The zero will ease the decrease in gain to −20 dB per decade but will add a phase shift in the opposite direction. As shown by the lines marked 203, the resulting system should be stable as the phase shift at the new crossover frequency $f_c$ is −90° instead of −180°. The phase shift at the crossover frequency, added to 180 degrees, can be referred to as the phase margin. A target of 45° is usually acceptable for producing a system that is stable for all conditions. Low phase margin causes overshoot and ringing in the transient response of the converter. In general, $f_z$ needs to be in the range of $f_c/2$ to produce a sufficient phase margin. Notably, the compensator does not need to be in series with the main path of the feedback loop and can instead be placed in parallel (i.e., the configuration of compensator 117 in feedback path 113 is only an example).

Figure 3:
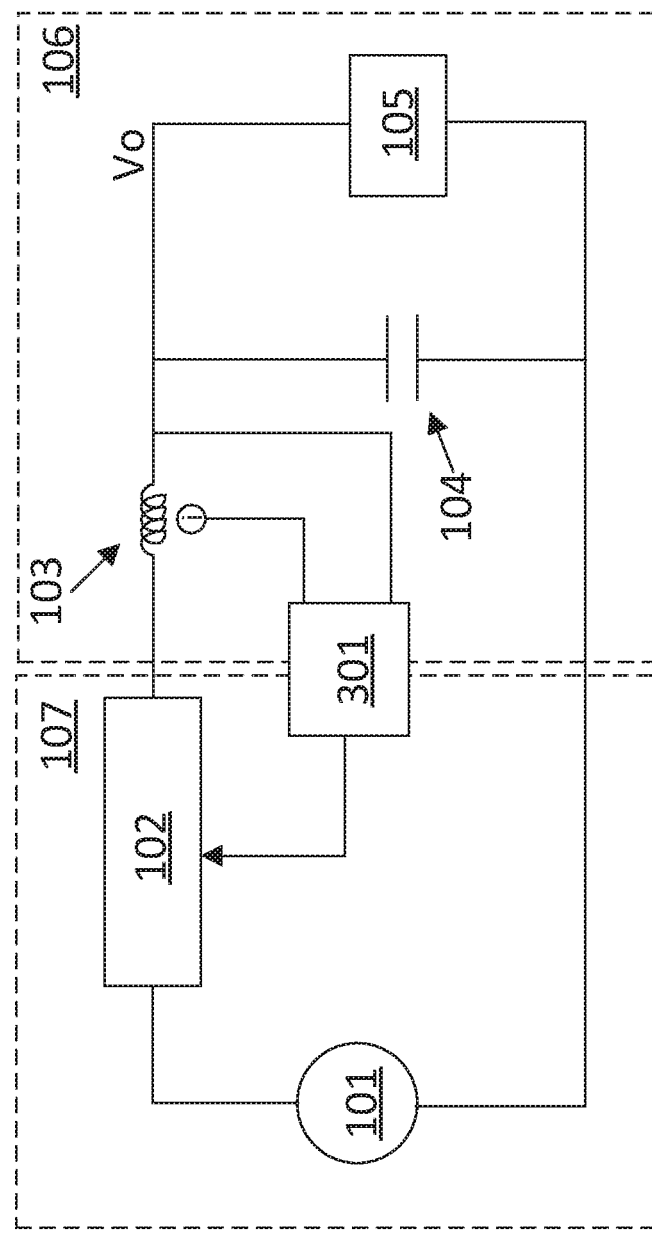
FIG. 3 illustrates a block diagram of a power converter topology that obtains two measurement signals from the output side of the power converter in accordance with embodiments of the present invention.

FIG. 3 illustrates a power converter 300 with a compensation scheme that provides the zero illustrated by lines marked 203. As illustrated, feedback path 301 includes a measurement of the output voltage $V_o$ and also includes a measurement of the current through inductor 103. This approach provides the required zero via the measurement of the inductor current and also guides the control loop to the desired voltage by comparing $V_o$ to $V_{ref}$. The benefit of this approach is that, since both the complex poles of the uncompensated transfer function and the zero of the compensator are proportional to the size of the output filter passives, the zero tracks changes in the output capacitance and will provide stability even if the cross-over frequency of the closed loop transfer function is pushed in by increased output capacitance from load 105. In some embodiments, the compensator is generally chosen to meet several metrics for the converters performance besides stability such as a minimum rise time, maximum allowable overshoot of the regulated voltage, maximum steady state error, and settling time constraints. Since $f_z$ needs to be less than half of $f_c$, setting $f_z$ based on the output passive devices requires an overly large capacitor in order to be effective. The compensator scheme should both scale with increased capacitance on the output node and also not place an additional limitation on the size of the output passives.

Figure 4:
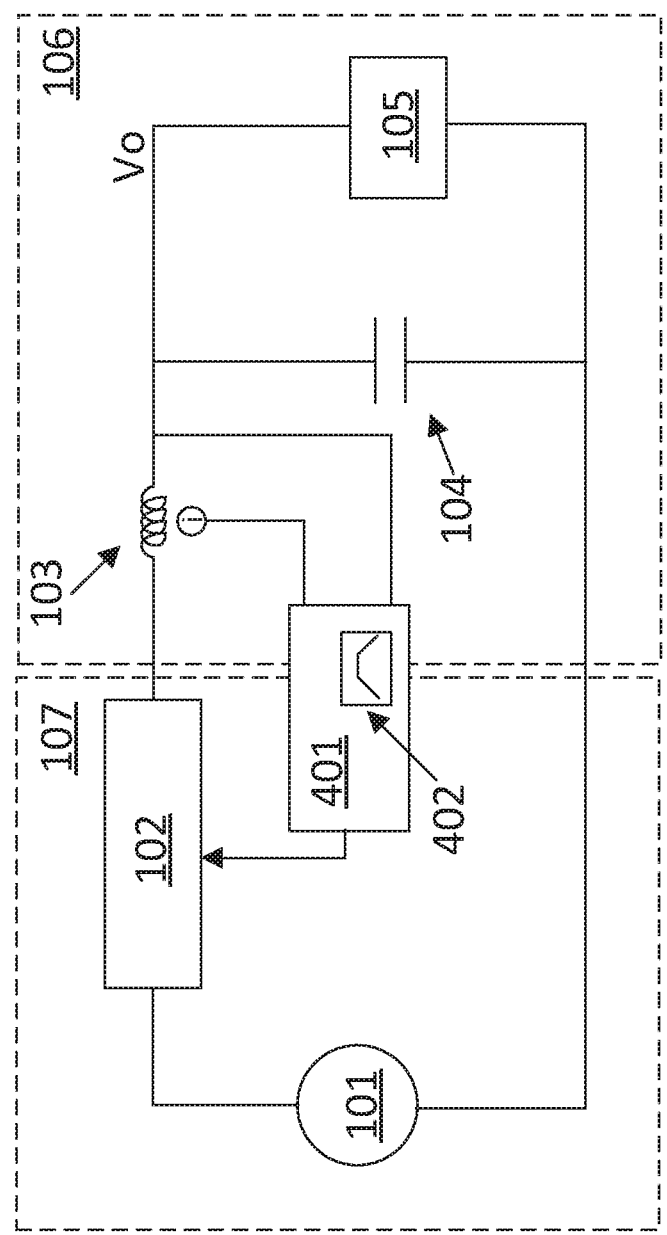
FIG. 4 illustrates a block diagram of a power converter topology that obtains two measurement signals from the output side of the power converter and includes a bandpass filter on the feedback path in accordance with embodiments of the present invention.

FIG. 4 illustrates another power converter 400 that utilizes feedback path 401 which obtains measurement signals representative of both the inductor current and output voltage. As before, power converter 400 includes a switch circuit 102 which will include a switch coupled to an input node and having a control node. The power converter also includes a feedback path 401 between the output node marked $V_o$ and that control node. However, in contrast to the approach in power converter 300, feedback path 401 includes a first circuit block 402 with a bandpass transfer function that operates on the signal drawn from the output voltage. As a result, in power converter 400, capacitor 104 can be set to the minimum value required by other constraints, besides those having to do with stability of the feedback path. This is because the zero provided by circuit block 402 is dissociated from the output passives and stability is provided by feedback path 401 even with minimal output capacitance on $V_o$. At the same time, if additional output capacitance is added by load 105, compensation provided by the measurement of current through inductor 103 can prevent the system from entering an unstable state.

Figure 5:
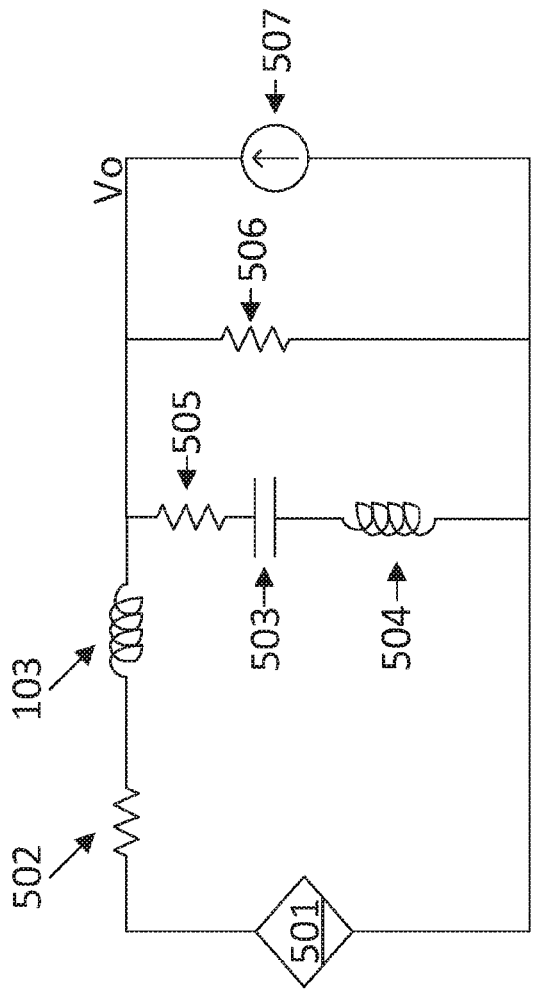
FIG. 5 illustrates a small signal circuit diagram of a power converter to illustrate certain aspects of embodiments of the present invention.

The action of first circuit block 402 can be described with reference to FIG. 5. This figure illustrates a small signal block diagram 500 of power converter 400 with capacitor 104 replaced with a more accurate model of the capacitor that includes certain parasitic elements. For example, the capacitor could exhibit an appreciable $R_c$ and $L_c$ in series with the actual capacitance. External ceramic capacitors generally exhibit this characteristic. In small signal block diagram 500, the capacitance of capacitor 104 is shown as element 503 and the parasitic resistance $R_c$ and inductance $L_c$ are shown as elements 505 and 504 respectively. The behavior of the switch circuit and series resistance of the filter inductor are modeled by variable supply element 501 and resistor 502. Variable supply element 501 has a voltage d×$V_{in}$ (d multiplied by $V_{in}$) where $V_{in}$ is the input voltage and d is the small-signal variation of the control switch duty cycle. Resistor element 502 has a resistance $R_L$ which includes the filter inductor series resistance and the average switch resistance over a switching cycle. The behavior of the load of the converter is modeled by resistor 506 and current source 507. Resistor 506 has a resistance R and current source 507 has a current $i_o$. The small-signal output voltage is then set by the equations in box 508. In this equation, R is the resistance of the load, L is the inductance of inductor 103, C is the capacitance of capacitor 503, $R_L$ is the parasitic series resistance of inductor 103 plus the average switch resistance over a switching cycle, and the parasitic inductance and resistance of capacitor 503 are $R_c$ and $L_c$.

As can be determined via careful inspection, equation 508 exhibits its own resonant frequency zeroes and quality factor that is set in part by the parasitics of the capacitor $R_c$ and $L_c$. This is problematic because $G_F$ affects the gain of the control loop. To counteract the resonance of the $G_F$ zeroes, the bandpass filter transfer function can be selected such that it has the same poles as the zeroes of $G_F$. As the bandpass filter transfer function appears on the feedback path of the control loop, the effect of the parasitics will be cancelled out in the overall control loop. First circuit block 402 is generally designed with attention to both the quality factor and center frequency of the band pass transfer function.

First circuit block 402 can be implemented by any band pass filter. However, certain benefits accrue to approaches in which first circuit block 402 is implemented as a multipath feedback active filter. In particular, the magnitude of the loop gain in decibels of the circuit block should remain appreciably positive at the center frequency of the filter to assure that the loop retains control of the circuit at that frequency. As used herein the term loop gain refers to the product of the open loop gain and feedback gain for a given circuit block. For stability, the phase margin of the loop gain should be greater than 45° and the cross over frequency of the loop gain in decibels should be greater than the center frequency of the band pass filter.

FIG. 6 provides an illustrative first circuit block 600 in the form of a multipath feedback active filter. As illustrated, block 600 includes an operational amplifier with gain $G_{mbp}$ and two feedback paths to either side of a resistor $R_2$ via a capacitor $C_2$ and a resistor $R_1$. A transconductance amplifier could alternatively be used. First circuit block 600 includes three external connections which can be used to describe how the circuit block is connected in converter 400.

The feedback path of converter 400 runs through first circuit block 600 from node $V_o$ to node $V_{bp}$. Node $V_o$ is the output node of converter 400 and is similarly labeled in FIG. 4. Node $V_{ref}$ connects to a reference voltage used to bias the amplifier. Notably, the presence of capacitor $C_1$ means that first circuit block 600 is AC coupled to the output side of the converter which results in the filter being at least partly defined by a pure bandpass characteristic. As first circuit block 600 will not allow a DC signal to pass through the branch of the feedback path that it provides, it can create a zero in the closed loop transfer function of the converter's control loop to provide stability to the system in a manner that is disassociated from the size of the output capacitor and output inductor of the converter. Other multipath feedback active filters can exhibit this feature. For example, first circuit block 601 is also at least partly defined by a pure bandpass characteristic and is AC coupled to node $V_o$. Block 601 also utilized an operational amplifier, but could be modified to utilize a transconductance amplifier.

Figure 7:
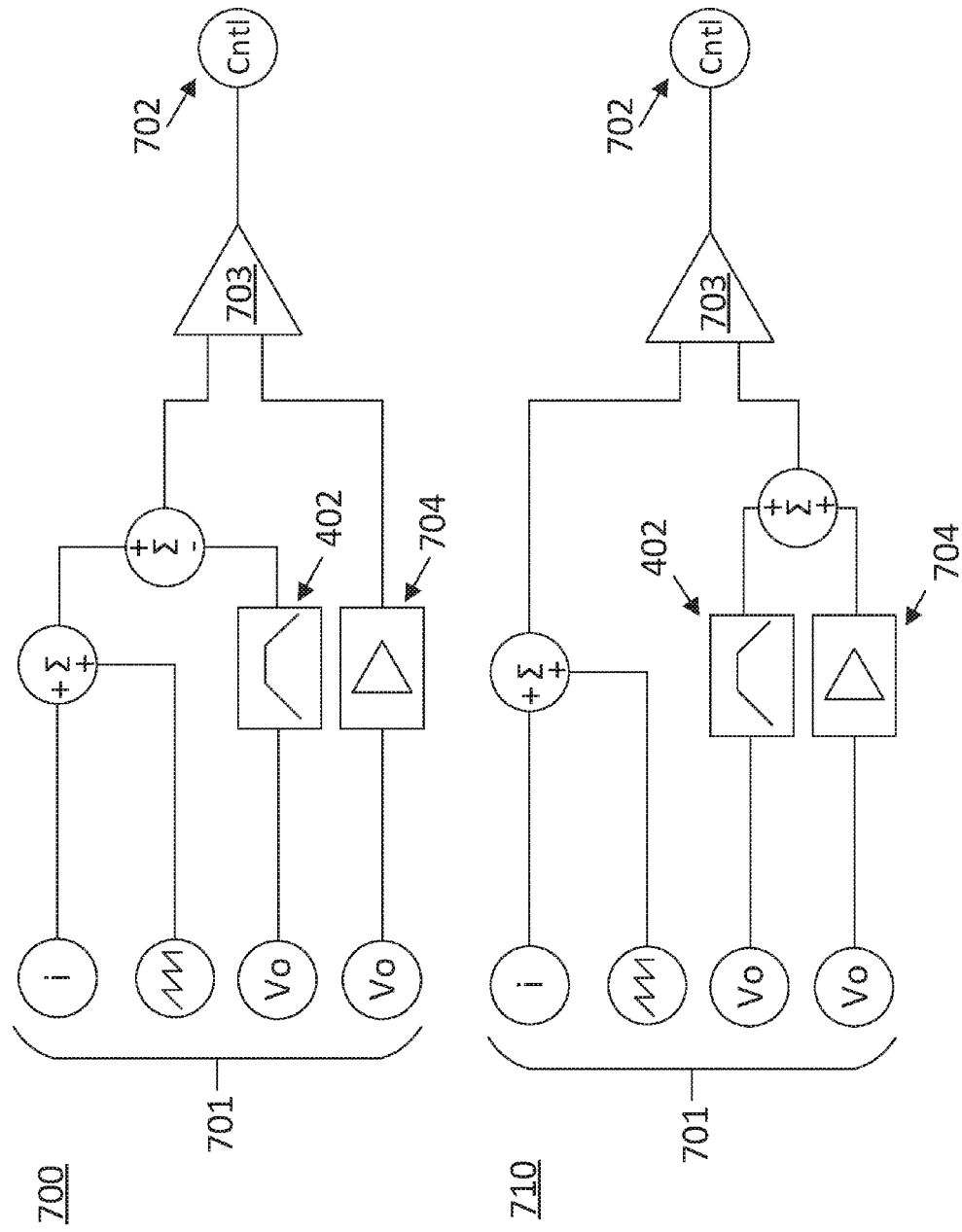
FIG. 7 illustrates two block diagrams of the feedback path in FIG. 4 in accordance with embodiments of the present invention.
Figure 8:
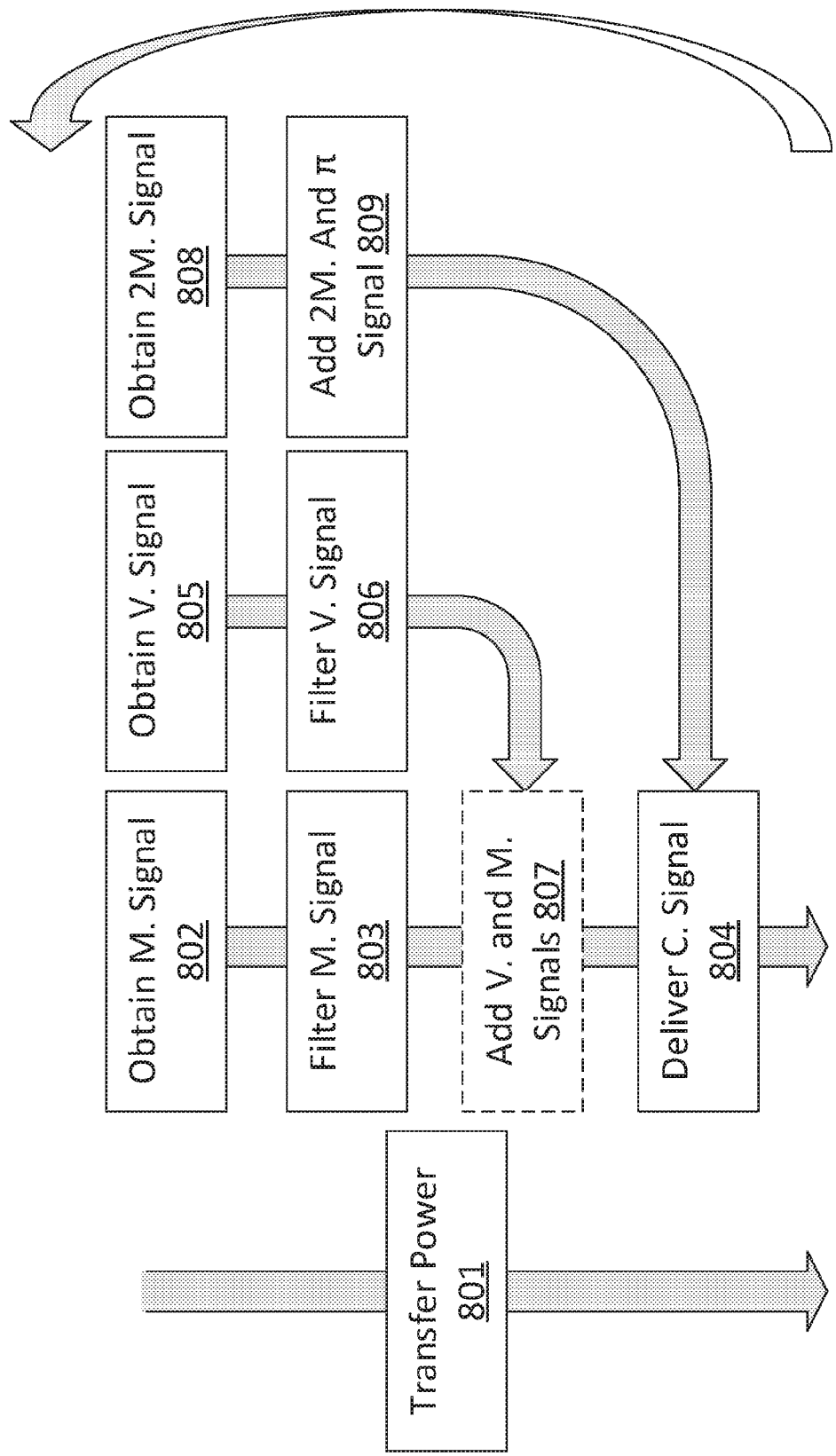
FIG. 8 illustrates a flow chart of a set of methods that are in accordance with embodiments of the present invention.

Different options for the overall topology and operation of feedback path 401 can be described with reference to the block diagrams of FIG. 7 and the flow chart of FIG. 8. FIG. 7 includes two block diagrams 700 and 710. Each diagram includes a set of inputs 701 on the left and an output to control node 702 on the right. The set of inputs include measurement signals taken from the output side of the power converter. In the examples illustrated in FIG. 7, a first measurement signal is based on the voltage on the output node of the inductor ("$V_o$") and a second measurement signal is based on the current through inductor 103 ("i"). The feedback paths exemplified by block diagrams 700 and 710 are utilized in power converters where the control node is driven by a pulse width modulator comparator 703 that is used to produce a control signal with a variable duty cycle. The comparator 703 is located on the feedback path and has a first input and a second input. The block diagram is simplified in that additional driver circuitry is usually interspersed between the output of the comparator and an actual control node (e.g., the gate of a field effect transistor).

The duty cycle of the control signal delivered to the control node is set by comparing a periodic ramp signal with the output of an error amplifier located on the feedback path 704. The error amplifier compares a first measurement signal from the output side of the converter with a reference signal. For example, the voltage on the output node of the converter $V_o$ can be compared with a reference voltage. This can be conducted by including a voltage divider circuit on the feedback path and connecting the output of the voltage divider circuit to the error amplifier. Block diagrams 700 and 710 exhibit this feature, but they are also augmented with a first circuit block 402 that serves as a bandpass filter, and a second measurement signal that is obtained from the output side of the converter. In these examples, the second measurement signal is based on the current through inductor 103. The individual contribution of the bandpass filter circuit block to the overall feedback path can be conceptualized as a compensator signal. As such, the block diagrams illustrate different ways in which the control signal delivered to control node 702 can be based on the first measurement signal, the second measurement signal, and the compensator signal.

The block diagrams in FIG. 7 differ in terms of how the signals are combined and applied through different branches of the feedback path. In block diagram 700 the output of first circuit block 402 is subtracted from the sum of the second measurement signal and the periodic signal. In block diagram 710 the output of the first circuit block 402 is added to the output of error amplifier circuit 704. The block diagrams are intended to convey a large number of potential architectures and topologies. In particular, the adder blocks can be implemented by actual adder circuit blocks or by placing the component circuit blocks whose outputs are being summed in series. For example, in block diagram 710 the adder connected to first circuit block 402 and error amplifier circuit 704 represents both the option of placing those blocks in series along the feedback path and the option of having a feedback path with a first branch and a second branch where those circuit blocks are on those separate branches and each terminates at the adder circuit block. Specific implementations of these approaches are described below in FIGS. 9-13.

The action of power converter architecture 400, and particular those implementations of power converter 400 that are in accordance with block diagrams 700 and 710, can be described with reference to flow chart 800 in FIG. 8. Flow chart 800 illustrates a set of methods for the operation of a power converter. The power converter includes the output node, input node, switch, and control node previously described, and may utilizes any of the feedback techniques described above in combination with these elements to deliver power from an input side of the converter to an output side of the converter. For purposes of explanation, the component steps of the set of methods illustrated by flow chart 800 are drawn linearly in parallel fashion with an arrow looping back to the beginning of the method. In actuality, the component steps may all be continuously conducted as the methods describe the behavior of a feedback system.

In step 801 power is transferred from an input node of the power converter to an output node of the converter using a switch connected to the input node. This step is conducted continuously with a variable level of power being delivered based on the instantaneous needs of a load connected to the output node of the power converter. The additional branches of flow chart 800 are conducted continuously and in tandem with the conduct of step 801. Indeed, the additional branches of flow chart 800 describe the continuous flow of information back from the output side of the converter to the input side of the converter in order to regulate the amount of power delivered in step 801.

The second branch of flow chart 800 includes step 802 of obtaining a first measurement signal, step 803 of filtering the measurement signal, and step 804 of delivering a control signal. In combination, the steps explain the operation of one portion of the feedback path of a power converter such as power converter 400. The first measurement signal can be obtained from either a voltage or current on the output side of the power converter. However, in the approaches illustrated in FIG. 7, the measurement signal is a voltage signal obtain from the output node $V_o$. In step 803 the measurement signal is filtered using a bandpass filter circuit block to obtain a filtered measurement signal. The bandpass filter circuit block can be first circuit block 402. In step 804, a control signal that is based on the filtered measurement signal is delivered to the control node. The control node can be control node 702 from FIG. 7.

The third branch of flow chart 800 includes step 805 of obtaining a voltage measurement signal, step 806 of filtering the voltage measurement signal, and step 807 of adding the filtered voltage measurement signal to the filtered measurement signal produced in step 803. Step 805 can be conducted using a voltage divider on the output side of the power converter. Step 806 can be conducted using an error amplifier and a low pass filter on the output of the error amplifier. Step 807 can be conducted by feeding the filtered signals to an adder circuit block. Step 807 can also be conducted by using the same voltage as the basis for the measurement signal in step 802 and the voltage signal in step 805. In this case, the filtered signals can be effectively added by placing the two filters in series and allowing both filtered signals to emerge at the output of the combined circuit blocks. In approaches in which this third branch is utilized, the control signal delivered in step 804 can be based on both the filtered first measurement signal and the filtered voltage measurement signal.

The fourth branch of flow chart 800 includes step 808 of obtaining a second measurement signal on the output side of the power converter and step 809 of adding the second measurement signal to a periodic (π) signal. The second measurement signal can be the inductor current "i" from block diagrams 700 and 710. In particular, the second measurement signal can be the inductor current of the power converter measured using a sense resistor or other current sensing circuit. The periodic signal can be a periodic ramp signal. The combined signal can then be delivered to the input of a PWM comparator. The other input to the PWM comparator can be the signal generated in step 807. However, step 807 could be conducted at the input of the PWM comparator as the second measurement signal could have been previously combined with the signal generated in step 803 as in block diagram 700.

Figure 9:
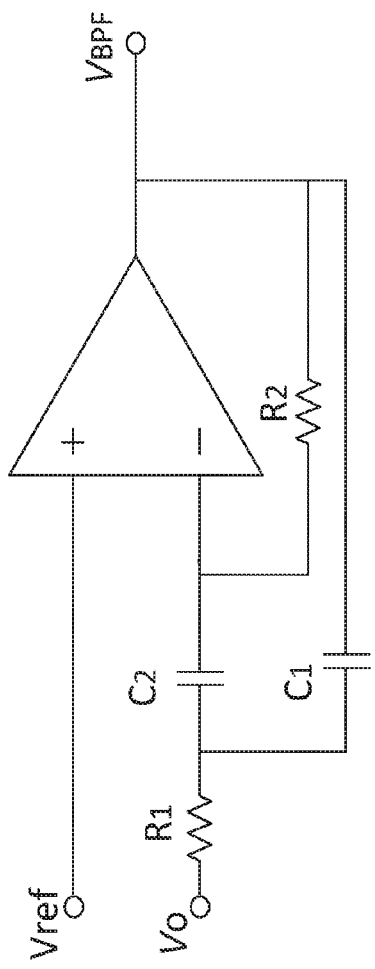
FIG. 9 illustrates a multipath feedback active filter along with the transfer function of the filter to illustrate certain aspects of embodiments of the present invention.

Certain benefits accrue to those approaches in which the center frequency and quality factor of the bandpass transfer function that defines circuit block 402 are designed to cancel out the effects of the effective series resistance and series inductance of the output capacitor of the power converter. In approaches where the first circuit block 402 is implemented using a multipath feedback active filter, the transfer function, and in particular the center frequency and quality factor of the transfer function, can be defined by a set of passive devices in the multipath feedback active filter. FIG. 9 illustrates one example multipath feedback active filter 900 with passive components $R_1$, $R_2$, $C_2$, and $C_1$. The figure also includes equation 901 which provides the transfer function of the filter along the feedback path from $V_o$ to $V_{BPF}$. If it is deconstructed according to standard conventions, equation 901 yields the resonant frequency expression and quality factor expression illustrated by equations 902. As shown, the quality factor and resonance of the bandpass filter can then be selected to counteract the effects of the effective series resistance 505 and effective series inductance 504 of the output capacitor of the power converter. In the case of a bandpass filter, the resonant frequency can also be referred to as the center frequency of the filter.

Selection of the components of the multiple feedback active filters utilized as bandpass filters should be conducted based on the characteristics of the output capacitor for a given application. The center frequency of the bandpass transfer function should be within one decade of the resonance caused by the output capacitor parasitics. Furthermore, the center frequency of the bandpass filter should generally be greater than the output filter resonance from L and C. The center frequency of the bandpass filter is a critical aspect of the design given that misalignment of the two values can result in an unstable converter. The quality factor of the bandpass transfer function should generally be greater than 0.5. From a first order perspective, the larger a quality factor, the sharper the phase transition and tighter the bandwidth of the gain of a transfer function. It is important for the phase transition of the bandpass function to be sharp in order for the benefit of the poles to be realized in time before the counteracting action of the output capacitor's zeroes forces the system into an unstable state at a given frequency.

Figure 10:
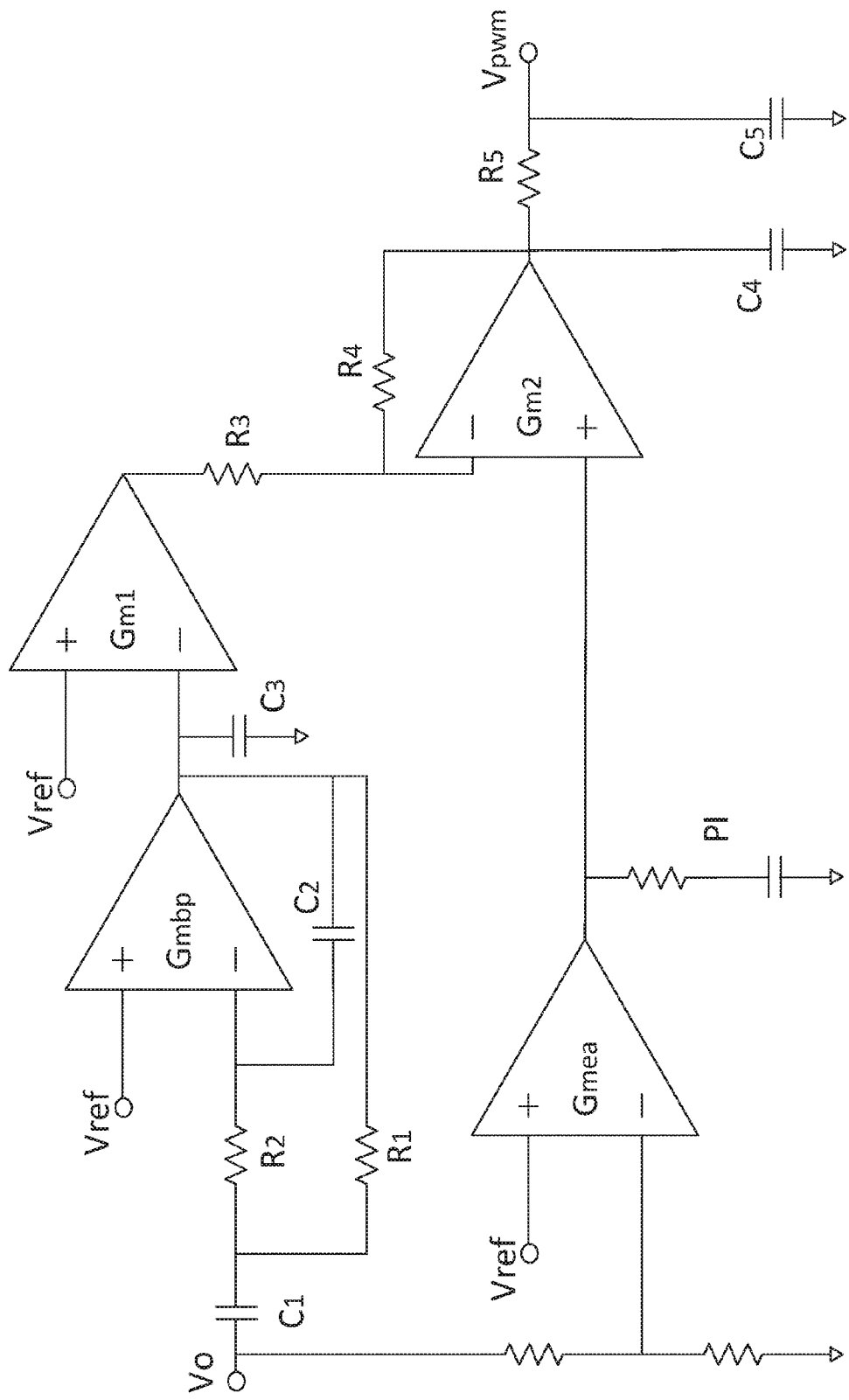
FIG. 10 illustrates a possible topology of the feedback path in FIG. 4 in accordance with embodiments of the present invention.

FIG. 10 illustrates a circuit topology 1000 which is a specific implementation of one portion of feedback path 401. Topology 1000 accepts the output node voltage of the converter as an input and also requires a reference voltage $V_{ref}$. First circuit block 402 is implemented using the transconductance amplifier marked with gain $G_{mbp}$ along with devices $C_1$, $C_2$, $R_2$, and $R_1$. The output node voltage is also connected to a voltage divider, the output of which is in turn connected to the transconductance amplifier with gain $G_{mea}$. This amplifier serves as the error amplifier. A proportional-integral compensator PI is connected to the output of the error amplifier. Topology 1000 also includes two additional transconductance amplifiers with gains marked $G_{m1}$ and $G_{m2}$. In combination with resistors $R_3$ and $R_4$, the output of the error amplifier and the output of the bandpass filter are added together. The combined signal is then passed through a low pass filter with a roll off frequency determined by $R_5$ and $C_5$. Compensation is also provided by capacitors $C_3$ and $C_4$. The output signal generated by topology 1000 on node $V_{pwm}$ is then provided to a first input of a PWM comparator which is not shown in the diagram. The sum of a second measurement signal, which can be the inductor current of the power converter, and a periodic ramp voltage is provided to the other input of the PWM comparator. The reference voltage provided to the $G_{m1}$ and $G_{mbp}$ amplifiers can be different and less accurate than the reference voltage provided to the $G_{mea}$ amplifier.

Figure 11:
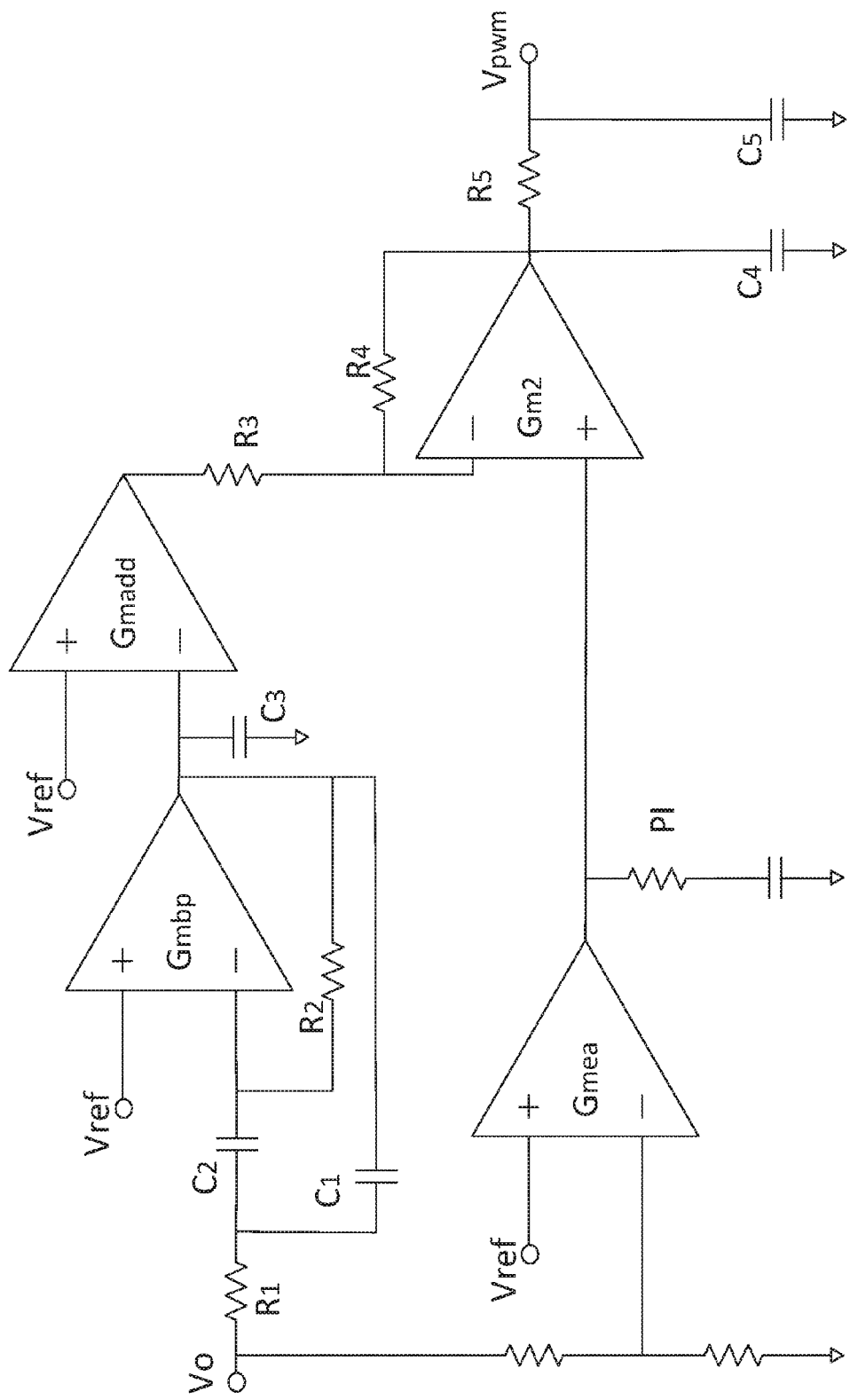
FIG. 11 illustrates another possible topology of the feedback path in FIG. 4 that utilizes a programmable amplifier in accordance with other embodiments of the present invention.

FIG. 11 illustrates a circuit topology 1100 which is a specific implementation of one portion of feedback path 401. Topology 1100 is similar to topology 1000 and like elements are labeled using the same reference identifiers. However, one branch of the feedback path is different in that first circuit block 402 is implemented using a resistor connected to node $V_o$. Notably, there is still no DC path through this implementation of circuit block 402 and the block is still defined by a pure bandpass transfer function in regular operation. To facilitate this modification, the second transconductance amplifier is the top circuit branch is also modified in that the gain $G_{madd}$ is programmable.

Figure 12:
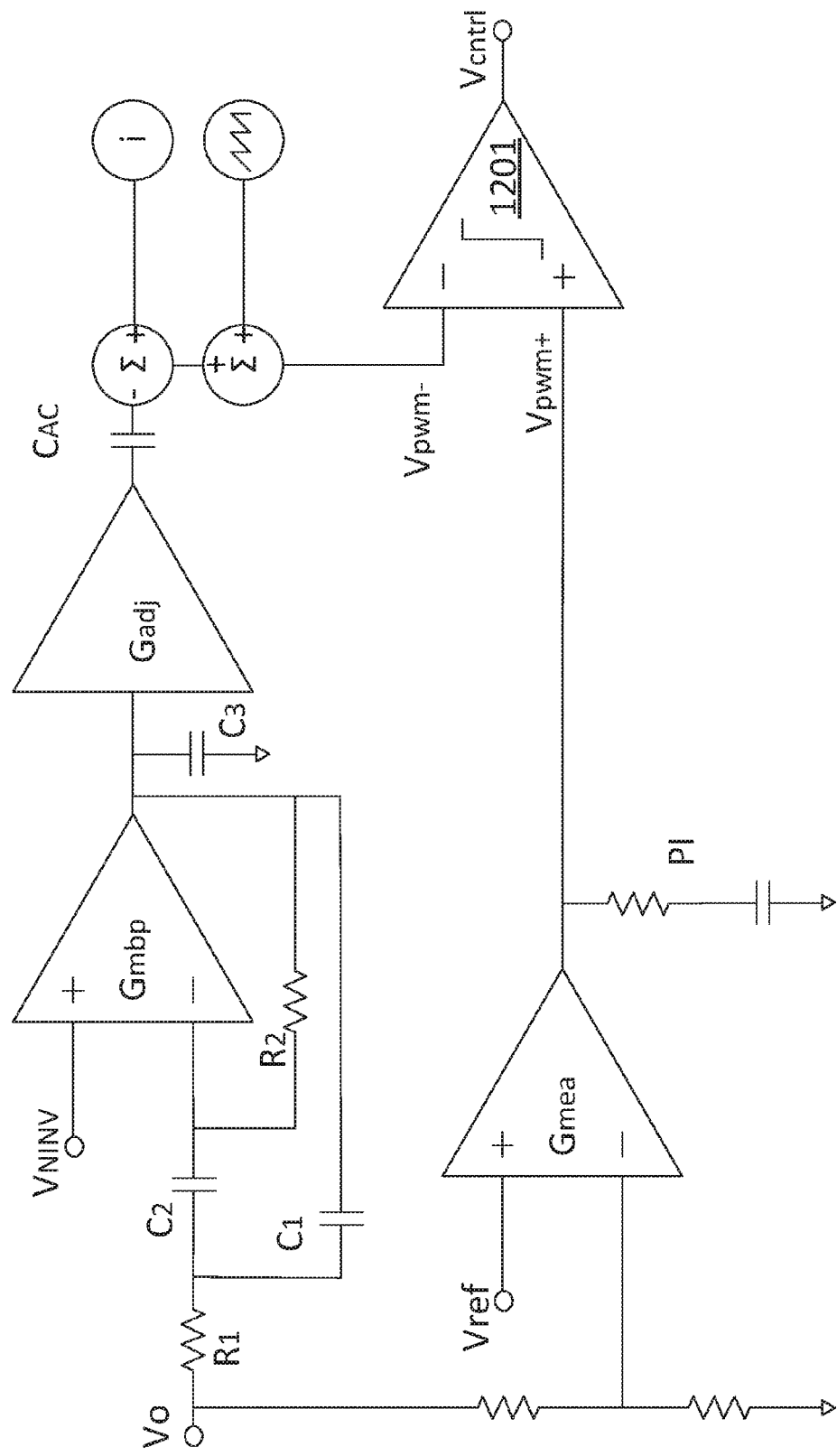
FIG. 12 illustrates another possible topology of the feedback path in FIG. 4 that combines the compensator signal with a second measurement signal before either signal is provided to a comparator in accordance with other embodiments of the present invention.

FIG. 12 illustrates a circuit topology 1200 which is a specific implementation of feedback path 401. In contrast to topologies 1000 and 1100, topology 1200 includes PWM comparator 1201 and illustrates the control node $V_{cntrl}$. Additional driver circuits may be located between the illustrated node and the actual control node of the switch circuit in the power converter. Like elements from the prior topologies are labeled using the same reference identifiers. As illustrated, the compensator signal produced by the bandpass filter is fed to a transconductance amplifier with an adjustable gain $G_{adj}$. The output of that amplifier is connected to an optional AC coupling capacitor $C_{AC}$. The resulting signal is then subtracted from a second measurement signal, which is the inductor current "i" in FIG. 12. The combined signal is then summed with a periodic ramp signal and is delivered to the negative input of PWM comparator 1201. The positive input of PWM comparator 1201 is connected to the output of the error amplifier and PI compensator. This topology requires a second reference voltage $V_{NINV}$ to bias the bandpass filter amplifier.

Figure 13:
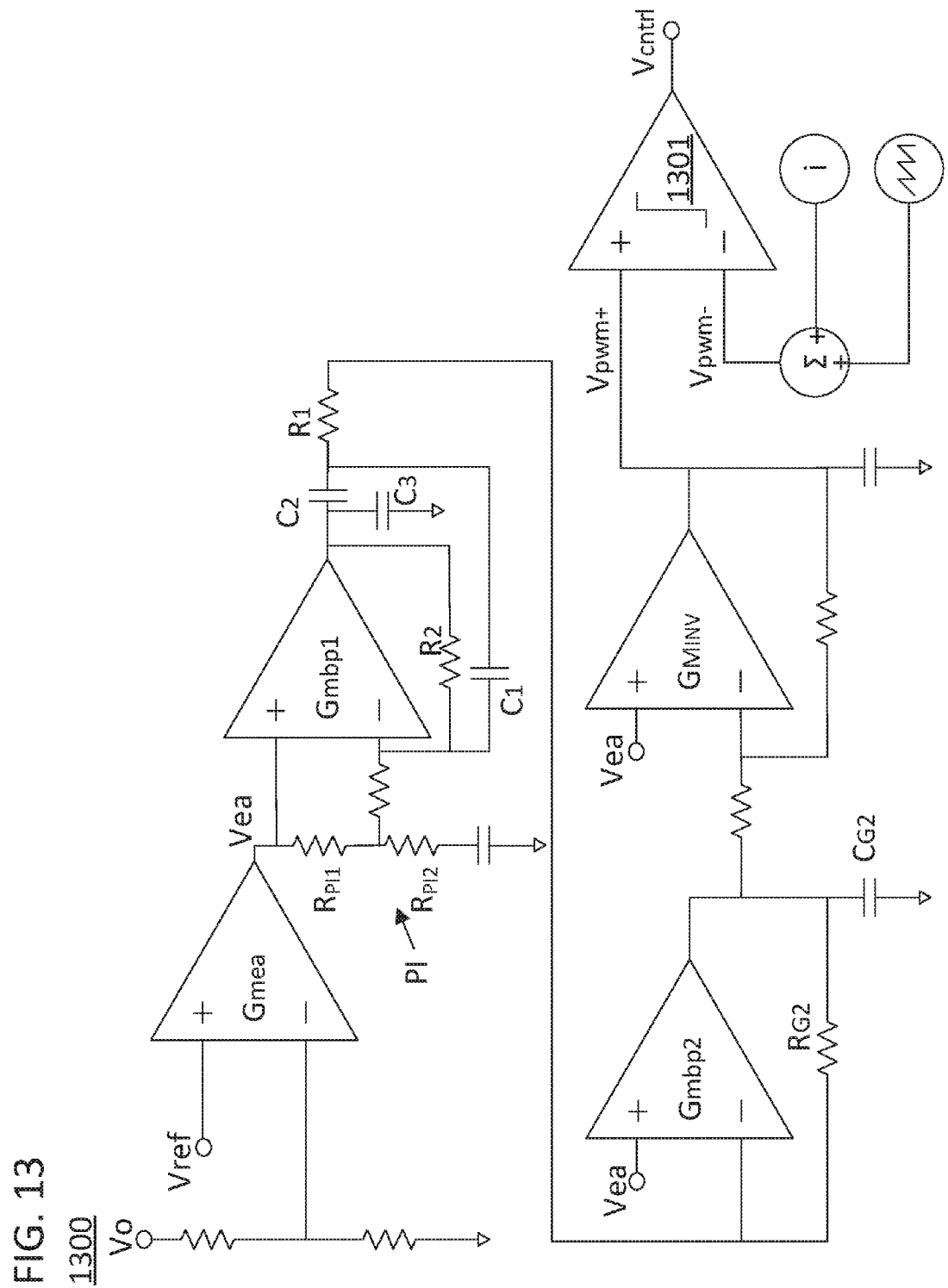
FIG. 13 illustrates another possible topology of the feedback path in FIG. 4 that adds a compensator signal and a first measurement signal by placing the bandpass filter and error amplifier in series in accordance with other embodiments of the present invention.

FIG. 13 illustrates a circuit topology 1300 which is a specific implementation of feedback path 401. Topology 1300 differs from the prior topologies in that the compensator signal generated by the bandpass filter is added to the error amplifier and PI compensator output by placing the circuit blocks in series. Like elements from the prior topologies are labeled using the same reference identifiers. The topology requires an additional transconductance amplifier with gain $G_{mbp2}$ and passive elements $R_{G2}$ and $C_{G2}$ to supplement the effect of the amplifier that is present in the prior topologies. The gain of that amplifier is $G_{mbp1}$ in topology 1300. Topology 1300 also requires an inverting amplifier with gain $G_{MINV}$ and a feedback network with two resistors to provide gain to the combine signal before it is delivered to the positive input of PWM comparator 1301. In this topology, the standard resistor for the PI amplifier is broken into two pieces $R_{PI1}$ and $R_{PI2}$. As such, the gain of the band pass filter and the PI amplifier can be independently adjusted. This is because the gain of the PI amplifier is set by the sum or these two resistors while the gain of the band pass filter is proportional to $R_{PI1}$ alone. As illustrated, topology 1300 includes an adder block to sum a second measurement signal in the form of inductor current "i" and a periodic ramp signal to deliver the resulting combined signal to the negative input of PWM comparator 1301. The diagram also illustrates control node $V_{cntrl}$, but additional driver circuits may be located between the illustrated node and the actual control node of the switch circuit in the power converter.

Figure 14:
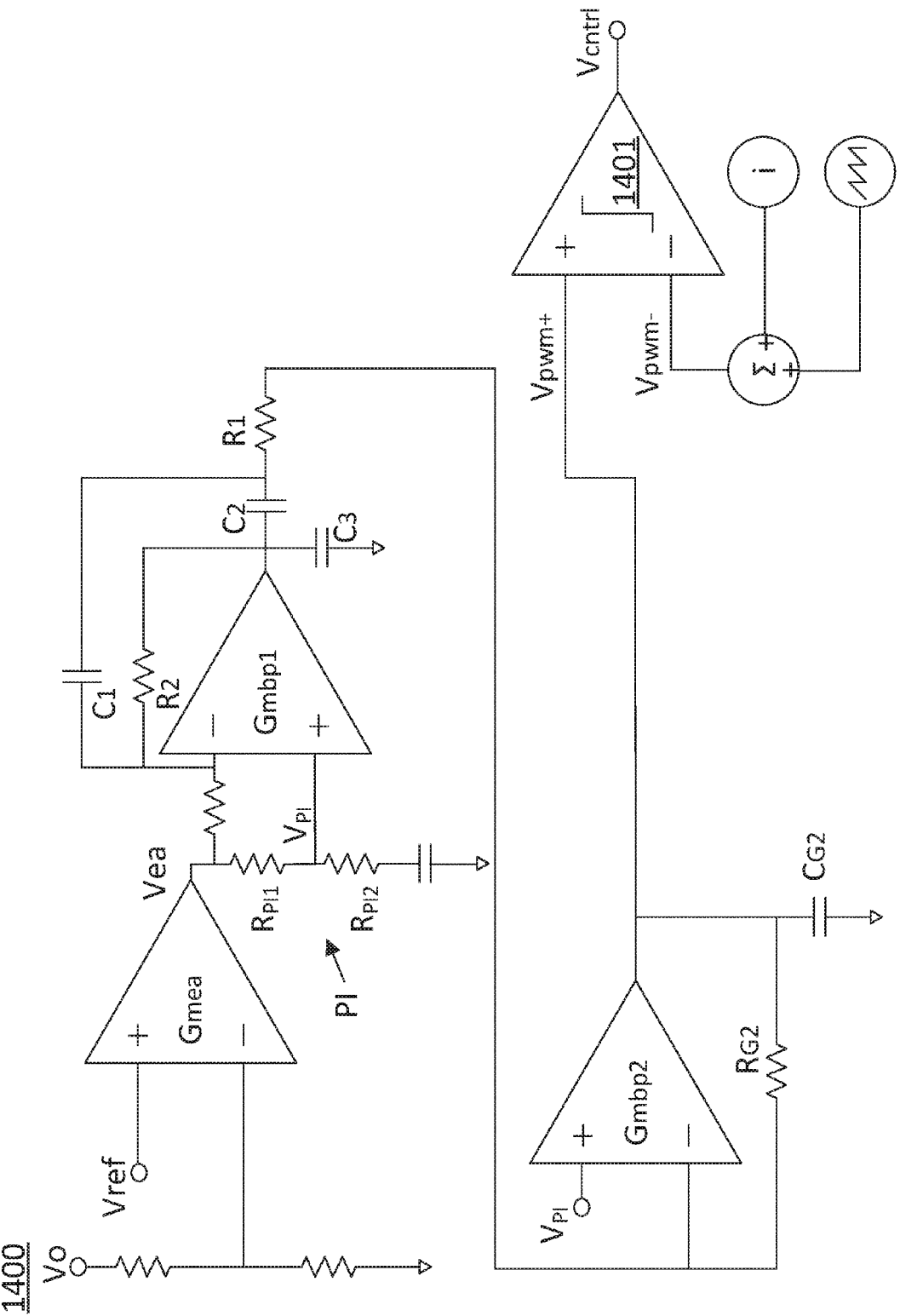
FIG. 14 illustrates another possible topology of the feedback path in FIG. 4 that adds a compensator signal and a first measurement signal by placing the bandpass filter and error amplifier in series in accordance with other embodiments of the present invention and uses one less amplifier than the topology in FIG. 13.

FIG. 14 illustrates a circuit topology 1400 which is a specific implementation of feedback path 401. Like elements from the prior topologies are labeled using the same reference identifiers. Topology 1400 is similar to topology 1300 in that it requires an additional transconductance amplifier with gain $G_{mbp2}$ and passive elements $R_{G2}$ and $C_{G2}$ to supplement the effect of the amplifier that is present in the prior topologies. However, topology 1400 differs from topology 1300 in that the PI amplifier and band pass filter are configured such that the inverting amplifier is no longer required. As illustrated, the output of the error amplifier feeds directly to the positive terminal of the amplifier with gain $G_{mbp1}$. As a result, the appropriate phase can be achieved for the input to comparator 1401 without the need for an additional inverter. The voltage input to the positive terminal of the transconductance amplifier with gain $G_{mbp2}$ is $V_{PI}$ in this approach which is the voltage that is induced at the noninverting input of the transconductance amplifier with gain $G_{mbp1}$.

While the specification has been described in detail with respect to specific embodiments of the invention, it will be appreciated that those skilled in the art, upon attaining an understanding of the foregoing, may readily conceive of alterations to, variations of, and equivalents to these embodiments. Although examples in the disclosure were directed to switching power converters that provided a fixed voltage to a regulated regime, the same approaches can be applied to power converters that provide a fixed current to a regulated regime. Furthermore, although examples in the disclosure were directed switching converters the approaches disclosed herein apply to any power converter scheme that relies on control loops with a feedback path from the output side of the converter to the input side of the converter. These and other modifications and variations to the present invention may be practiced by those skilled in the art, without departing from the scope of the present invention, which is more particularly set forth in the appended claims.

What is claimed is:

1. A power converter comprising:
    an input node on an input side of the power converter;
    an output node on an output side of the power converter;
    an inductor connected to the output node; a capacitor connected to the output node and a reference node;
    a switch coupled to the input node and having a control node, wherein the switch is connected to the inductor, the switch is a field effect transistor, and the control node is a gate of the field effect transistor;
    a feedback path between the output node and the control node;
    a first circuit block on the feedback path with a multipath feedback active filter;
    a comparator located on the feedback path having a first input and a second input, wherein the comparator sets a duty cycle of a control signal delivered to the control node;
    an error amplifier located on the feedback path; and
    a current sensing circuit measuring a current through the inductor and located on the feedback path; wherein the first circuit block is at least partly defined by a pure bandpass transfer function; and wherein a quality factor of the pure bandpass transfer function is greater than 0.5.

2. The power converter of claim 1 wherein: the first circuit block is at least partly defined by a loop gain; a magnitude of the loop gain in decibels is greater than 3 dB at a center frequency of the pure bandpass transfer function; and a phase margin of the loop gain is greater than or equal to 45°.

3. The power converter of claim 1 wherein:
    the capacitor has an effective series resistance and an effective series inductance that produce a resonance at a resonant frequency; and
    a center frequency of the pure bandpass transfer function is within one decade of the resonant frequency.

4. The power converter of claim 1 wherein:
    the quality factor and a center frequency of the pure bandpass transfer function are defined by a set of passive devices in the multipath feedback active filter.

5. The power converter of claim 1 wherein:
    the feedback path includes a voltage divider circuit; and
    the error amplifier is connected to the voltage divider circuit.

6. The power converter of claim 1 wherein:
    the feedback path includes the first circuit block and the error amplifier in series.

7. The power converter of claim 1 further comprising:
    an adder circuit block located on the feedback path;
    wherein the feedback path has a first circuit branch and a second circuit branch;
    wherein the first circuit branch includes the first circuit block and terminates at the adder circuit block; and
    wherein the second circuit branch includes the error amplifier and terminates at the adder circuit block.

8. The power converter of claim 1, wherein the multipath feedback active filter comprises:
    an amplifier with first and second circuit block feedback paths providing feedback from an output of the amplifier to an input of the amplifier, the first circuit block feedback path comprising a feedback resistor that is not in series with a feedback capacitor, and the second circuit block feedback path comprising a feedback capacitor that is not in series with a feedback resistor.

9. A power converter comprising:
    an input node on an input side of the power converter;
    an output node on an output side of the power converter;
    an inductor connected to the output node;
    a capacitor connected to the output node and a reference node;
    a switch with a control node, wherein the switch is connected to the inductor, the switch is a field effect transistor, and the control node is a gate of the field effect transistor;
    a feedback path between the output node and the control node;
    a pulse width modulator that provides a control signal to the control node;
    a bandpass circuit that: (i) is AC coupled to the output side of the power converter; (ii) includes a multipath feedback active filter; and (iii) produces a compensator signal;
    a sense circuit connected to the output side of the power converter that produces a first measurement signal;

a comparator located on the feedback path having a first input and a second input, wherein the comparator sets a duty cycle of the control signal;

an error amplifier located on the feedback path; and a current sensing circuit measuring a current through the inductor and located on the feedback path; wherein the control signal is based on the compensator signal and the first measurement signal; and wherein a quality factor of the bandpass circuit is greater than 0.5.

10. The power converter of claim 9 wherein: the bandpass circuit is at least partly defined by a loop gain; a magnitude of the loop gain in decibels is greater than 3 dB at a center frequency of the bandpass circuit; and a phase margin of the loop gain is greater than or equal to 45°.

11. The power converter of claim 9 wherein:
the capacitor has an effective series resistance and an effective series inductance that produce a resonance at a resonant frequency; and
a center frequency of the bandpass circuit is within one decade of the resonant frequency.

12. The power converter of claim 9 wherein:
the quality factor and a center frequency of the bandpass circuit are defined by a set of passive devices in the multipath feedback active filter.

13. The power converter of claim 9 wherein:
the feedback path includes a voltage divider circuit; and
the error amplifier is connected to the voltage divider circuit.

14. The power converter of claim 9 wherein:
the feedback path includes the bandpass circuit and the error amplifier in series.

15. The power converter of claim 9 further comprising:
an adder circuit block located on the feedback path;
wherein the feedback path has a first circuit branch and a second circuit branch;
wherein the first circuit branch includes the bandpass circuit and terminates at the adder circuit block; and
wherein the second circuit branch includes the error amplifier and terminates at the adder circuit block.

16. The power converter of claim 9, wherein the bandpass circuit comprises:
an amplifier with first and second bandpass circuit feedback paths providing feedback from an output of the amplifier to an input of the amplifier, the first bandpass circuit feedback path including a feedback capacitor having a first node coupled to the output of the amplifier and a second node coupled to the input of the amplifier, the second bandpass circuit feedback path including a first feedback resistor and a second feedback resistor, the first feedback resistor having a first node coupled to the output of the amplifier and a second node coupled to a first node of the second feedback resistor, a second node of the second feedback resistor being coupled to the input of the amplifier.

17. A method for converting power using a power converter comprising:
transferring power from an input node to an output node using a switch connected to the input node, wherein the switch defines an output side and an input side of the power converter, and wherein the switch has a control node;
obtaining a measurement signal from one of a voltage and a current on the output side of the power converter;
filtering the measurement signal using a bandpass filter circuit block to obtain a filtered measurement signal;
obtaining a voltage measurement signal from a voltage divider on the output side;
filtering the voltage measurement signal using a low pass circuit block to obtain a filtered voltage measurement signal;
adding the filtered voltage measurement signal to the filtered measurement signal using an adder circuit block;
obtaining a second measurement signal on the output side;
adding the second measurement signal to a periodic signal; and
delivering a control signal based on the filtered measurement signal to the control node using a controller, wherein the control signal is based on both the filtered measurement signal and the filtered voltage measurement signal, and the control signal is also based on both the second measurement signal and the periodic signal; wherein the bandpass filter circuit block is AC coupled to the output side; wherein the bandpass filter circuit block has a quality factor greater than 0.5; wherein the bandpass filter circuit block has a bandpass transfer function with a center frequency; and wherein the bandpass transfer function is provided by a multipath feedback active filter with an amplifier.

\* \* \* \* \*